United States Patent
Chakraborty et al.

(10) Patent No.: US 6,763,303 B2
(45) Date of Patent: Jul. 13, 2004

(54) SYSTEM FOR CLASSIFYING SEAFLOOR ROUGHNESS

(75) Inventors: Bishwajit Chakraborty, Dona Paula (IN); Vijay Kodagali, Dona Paula (IN); Jennifer Baracho, Dona Paula (IN); Anthony Joseph, Dona Paula (IN)

(73) Assignee: Council of Scientific and Industrial Research, New Delhi (IN)

( * ) Notice: Subject to any disclaimer, the term of this patent is extended or adjusted under 35 U.S.C. 154(b) by 33 days.

(21) Appl. No.: 10/106,706

(22) Filed: Mar. 25, 2002

(65) Prior Publication Data

US 2003/0182062 A1 Sep. 25, 2003

(51) Int. Cl.[7] ............................................... G06F 19/00
(52) U.S. Cl. ............................................... 702/2; 702/5
(58) Field of Search .................... 702/2, 5, 16; 382/157

(56) References Cited

U.S. PATENT DOCUMENTS

| | | | | |
|---|---|---|---|---|
| 5,283,838 A | * | 2/1994 | Togawa et al. ............. | 382/157 |
| 5,584,291 A | * | 12/1996 | Vapola et al. .............. | 600/301 |
| 5,592,227 A | * | 1/1997 | Feng ...................... | 375/240.14 |
| 5,640,369 A | * | 6/1997 | Capell, Sr. ................. | 367/88 |
| 5,793,703 A | * | 8/1998 | Shippey ................... | 367/88 |
| 5,796,611 A | * | 8/1998 | Ochiai et al. ................ | 702/3 |
| 6,038,337 A | * | 3/2000 | Lawrence et al. .......... | 382/156 |
| 6,130,641 A | * | 10/2000 | Kraeutner et al. .......... | 342/179 |
| 6,226,408 B1 | * | 5/2001 | Sirosh ...................... | 382/224 |
| 6,298,351 B1 | * | 10/2001 | Castelli et al. .............. | 707/102 |
| 6,477,469 B2 | * | 11/2002 | Ye et al. .................... | 702/11 |
| 6,549,853 B2 | | 4/2003 | Chakraborty et al. ......... | 702/14 |
| 6,571,228 B1 | * | 5/2003 | Wang et al. ................. | 706/16 |
| 2003/0147558 A1 | * | 8/2003 | Loui et al. .................. | 382/225 |

OTHER PUBLICATIONS

Z. Michalopoulou, D. Alexandrou, and C. de Moustier, Application of Neural and Statistical Classifiers to the Problem of Seafloor Characterization, IEEE Journal of Oceanic Engineering, vol. 20, No. 3, Jul. 1995, pp. 190–197.*

B. Chakraborty et al., Acoustic Seafloor Sediment Classification Using Self–Organizing Feature Maps, *IEEE Transactions on Geoscience and Remote Sensing* 39(12): 2722–2725 (2001).

B. Chakraborty et al., Seabottom Characterization Using Multi–beam Echo–sounder: An Application of the Composite Roughness Theory, *IEEE Transactions on Geoscience and Remote Sensing* 38: 2419–2422 (2000).

* cited by examiner

*Primary Examiner*—Marc S. Hoff
*Assistant Examiner*—Anthony Gutierrez
(74) *Attorney, Agent, or Firm*—Morgan, Lewis & Bockius LLP (57) ABSTRACT

The present invention relates to a novel system for seafloor classification using artificial neural network (ANN) hybrid layout with the use of unprocessed multi-beam backscatter data and more importantly, this invention relates to an real-time seafloor roughness classifier using backscatter data after training the self-organized mapping (SOM) network and learning vector quantization (LVQ) network wherein, the system of the present invention has the unique capability for the combined use of unsupervised SOM followed by supervised LVQ to achieve a highly improved performance in the said roughness classification, which was hitherto non-existent and has the additional capability for the use of a combination of the two variants of the LVQ layout to work together to achieve the best results in seafloor roughness classification.

34 Claims, 9 Drawing Sheets

| STUDY AREA | ROUGHNESS PARAMETERS | | | SOM | LVQ1 | LVQ2 | LVQ1 + LVQ2 |
|---|---|---|---|---|---|---|---|
| | BETA | GAMMA | $C_{hr}{}^\alpha$ | CLASSIFICATION PERCENTAGES | | | |
| A | 0.005 | 3.02 | 0.0004 | 37 | 98 | 80 | 100 |
| B | 0.007 | 3.00 | 0.0008 | 62 | 97 | 97 | 100 |
| C | 0.005 | 3.02 | 0.002 | 40 | 97 | 91 | 100 |

Fig. 9

SYSTEM FOR CLASSIFYING SEAFLOOR ROUGHNESS

FIELD OF THE INVENTION

The present invention relates to a system for classifying seafloor roughness using artificial neural network (ANN) hybrid layout from unprocessed multi-beam backscatter data. More particularly, the present invention relates to a system for online seafloor roughness classification from unprocessed multi-beam angular backscatter data using unsupervised learning as a pre-processor and supervised learning as the concluding block for improved classification, resulting in a highly efficient hybrid neural network layout to classify an unclassified dataset.

BACKGROUND OF THE INVENTION

Hitherto known neural classifier for seafloor classification [Z. Michalopoulou, D. Alexandrou, and C. de Moustier, "Application of Neural and Statistical Classifiers to the Problem of Seafloor Characterization", *IEEE Journal of Oceanic Engineering*, Vol. 20, pp. 190–197 (1994)] describes a self-organizing map (SOM) network that is applied to multi-beam backscatter dataset. The drawback of this system is that it can use only processed data. Another drawback is its unsuitability for on-line application.

An alternate system [B. Chakraborty, R. Kaustubha, A. Hegde, A. Pereira, "Acoustic Seafloor Sediment Classification Using Self Organizing Feature Maps", *IEEE Transactions Geoscience and Remote Sensing*, Vol. 39, No. 12, pp. 2722–2725 (2001)] describes a SOM network wherein single-beam dataset is used for seafloor classification, and this system is more suited to online use. However, a limitation of this system is that it requires pre-processing of the time-series dataset prior to classification.

In U.S. patent application Ser. No. 09/814,104 the Applicants have described a system which is incorporated in seafloor classification. This system described in this application estimates the seafloor acoustic backscattering strength with recorded root-mean-square (r.m.s) echo-voltage and the signal duration for each beam. In this system, multi-beam angular backscatter data have been acquired from the various seafloor areas around the Indian Ocean using a multi-beam acoustic system (Hydrosweep) installed onboard the Ocean Research Vessel Sagar Kanya. A drawback of the aforesaid system is that it requires large time-overhead to correct the raw data for range-related gain, seafloor slope correction, and insonification-depth normalization.

Yet another system [B. Chakraborty, H. W. Schenke, V. Kodagali, and R. Hagen, "Seabottom Characterization Using Multi-beam Echo-sounder: An Application of the Composite Roughness Theory", *IEEE Transactions Geoscience and Remote Sensing*, Vol. 38, pp. 2419–2422 (2000)] describes a system for seafloor classification, wherein it has been observed that the seafloor roughness parameters (power-law parameters) are the ideal parameters for classification. The drawback of this system is that seafloor classification can be implemented only after carrying out physical modeling of composite roughness parameters.

OBJECTS OF THE INVENTION

The main object of the present invention is to provide a novel system for seafloor classification using artificial neural network (ANN) hybrid layout with the use of unprocessed multi-beam backscatter data.

Another object of the present invention is to provide a system for on-line (i.e., real-time) seafloor classification using backscatter data after training the self-organized mapping (SOM) network and learning vector quantization (LVQ) network.

Yet another object of the present invention is to provides a system that incorporates a hybrid network using unsupervised SOM as the first block for coarse classification of the seafloor backscatter data and supervised LVQ for highly improved performance in the said classification.

Still another object of the present invention is to provide a system which incorporates a combination of two variations of the LVQ layout to work together to achieve the best classification results.

SUMMARY OF THE INVENTION

The present invention relates to a system for classifying seafloor roughness using artificial neural network (ANN) hybrid layout from unprocessed multi-beam backscatter data. More particularly, the present invention relates to a system for online seafloor roughness classification from unprocessed multi-beam angular backscatter data using unsupervised learning as a pre-processor and supervised learning as the concluding block for improved classification, resulting in a highly efficient hybrid neural network layout to classify an unclassified dataset.

DETAILED DESCRIPTION OF THE INVENTION

Accordingly, the present invention provides a system for classifying seafloor roughness using artificial neural network (ANN) hybrid layout from unprocessed multi-beam backscatter data, said system comprising a means for generating unprocessed multi-beam backscatter r.m.s. data attached to the input of a self-organizing map (SOM) preprocessor (20), said SOM preprocessor being attached through one or more Learning Vector Quantization (LVQ) variants (21 and 23) to a memory/display module (22).

In an embodiment of the present invention, the means for generating unprocessed multi-beam backscatter r.m.s. data comprises a multi-beam acoustic device mounted beneath a ship's hull and attached to an r.m.s. estimator module through a beam former module.

In another embodiment of the present invention, the multi-beam acoustic device comprises a linear array of transducers connected to a roll-pitch-heave sensor through cable connection boxes and an array of transmit-receive systems.

In yet another embodiment of the present invention, the multi-beam acoustic device comprises of two identical arrays of acoustic transducers mounted at right angles to each other.

In still another embodiment of the present invention, each array of the acoustic transducer is a combination of several sub-arrays and each sub array consists of multitude of elements.

In a further embodiment of the present invention, each element form a set of channels.

In one more embodiment of the present invention, the arrays can be used either for transmission or for reception of signals.

In one another embodiment of the present invention, the multi-beam acoustic device is connected to the beam former module through a preamplifier and a time varying gain adjustment circuit.

In an embodiment of the present invention, beam forming is accomplished using appropriate delays.

In another embodiment of the present invention, the beam former module is connected to the r.m.s. estimator module through a digital to analog converter, a filter, and a analog to digital converter.

In still another embodiment of the present invention, a display means is optionally connected to the analog to digital converter.

In yet another embodiment of the present invention, the display means is connected to the analog to digital converter through a bottom-tracking gate.

In a further embodiment of the present invention, the output pattern of the r.m.s. estimator module is the envelope of the r.m.s. signal amplitude Vs. beam number in cross-track direction.

In one more embodiment of the present invention, self-organizing map (SOM) preprocessor classifies the seafloor data into various roughness types and clusters them.

In one another embodiment of the present invention, the roughness parameters are distinguished based on the ship's cross-track angular multi-beam signal backscatter shape parameter.

In an embodiment of the present invention, each cluster formed represents an unique pattern of the input data.

In another embodiment of the present invention, the number of clusters thus formed is equal to the number of differing patterns of received seafloor data set.

In yet another embodiment of the present invention, the clusters are formed with the inherent unsupervised learning feature of the SOM preprocessor.

In still another embodiment of the present invention, the clusters are formed without any prior knowledge of the number of the different types of input patterns.

In a further embodiment of the present invention, the Learning Vector Quantization (LVQ) variant overcomes the imperfection in classification arising from the process of unsupervised classification done by SOM preprocessor.

In one more embodiment of the present invention, the improvements seafloor classification is achieved by supervised learning.

In one another embodiment of the present invention, the supervised learning is imparted to the LVQ by a human interpreter based on the ground truth data set.

In an embodiment of the present invention, said system incorporates a LVQ designed to avoid misclassification at the central portion of the weight-distribution of each cluster or a LVQ designed to distinguish the overlapping tails of the weight distribution of adjacent clusters or a combination of both.

In another embodiment of the present invention, the LVQ designed to avoid misclassification at the central portion is based on "reward-punishment" criterion.

In yet another embodiment of the present invention, the LVQ moves the weight-vector from the input if it is wrongly represented and the weight-vector is made to match the input more closely if its correctly represented.

In still another embodiment of the present invention, the LVQ designed to distinguish the overlapping of tails employs the technique of redistribution of the weights of the overlapping portion of the adjacent clusters to the respective parent clusters.

In one more embodiment of the present invention, human interpreter can make use of the results displayed on the display device to make further judgements on the quality of classification.

Figure 3:
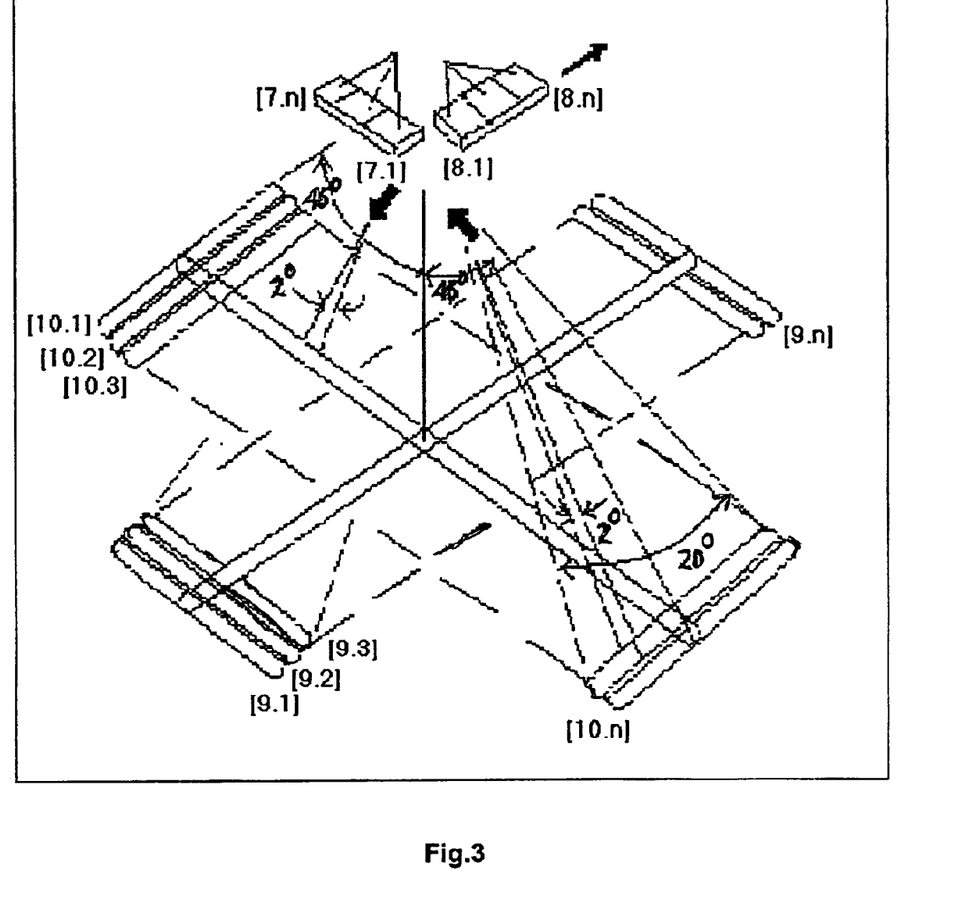
FIG. 3 indicates the geometry used in multi-beam echo-sounder for collection of acoustic backscatter data from the seafloor.
Figure 5:
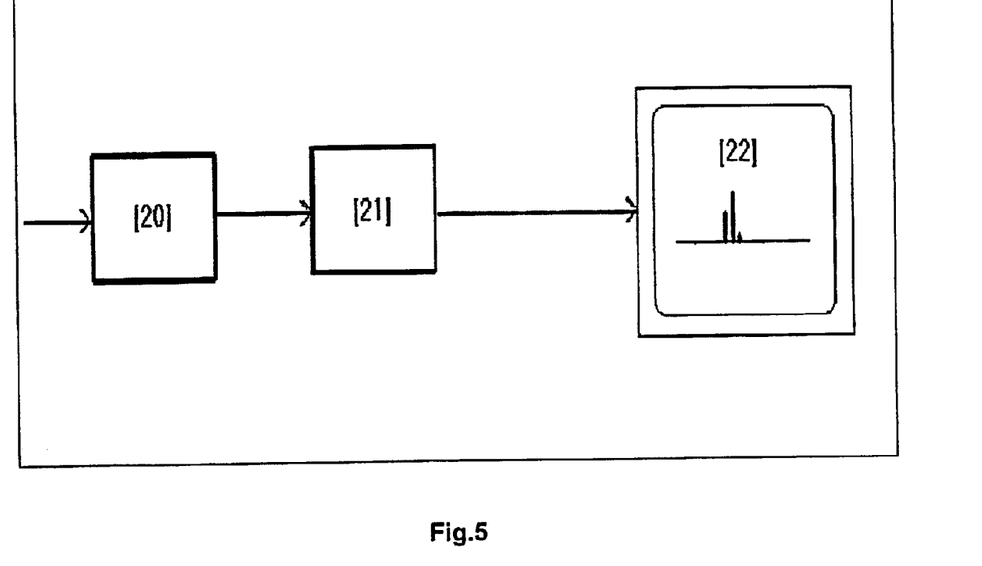
FIG. 5 represents the schematic block diagram of the hybrid ANN layout using SOM as the preprocessor and LVQ1 for improved classification.
Figure 6:
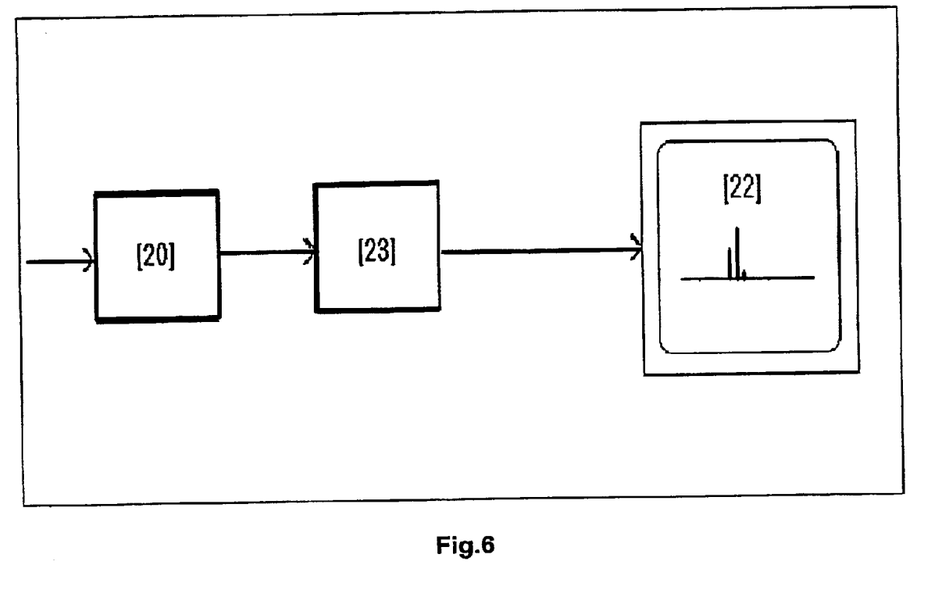
FIG. 6 indicates the block schematic of an alternate hybrid ANN layout using SOM network followed by LVQ2 for fine-tuning of cluster boundaries.
Figure 7:
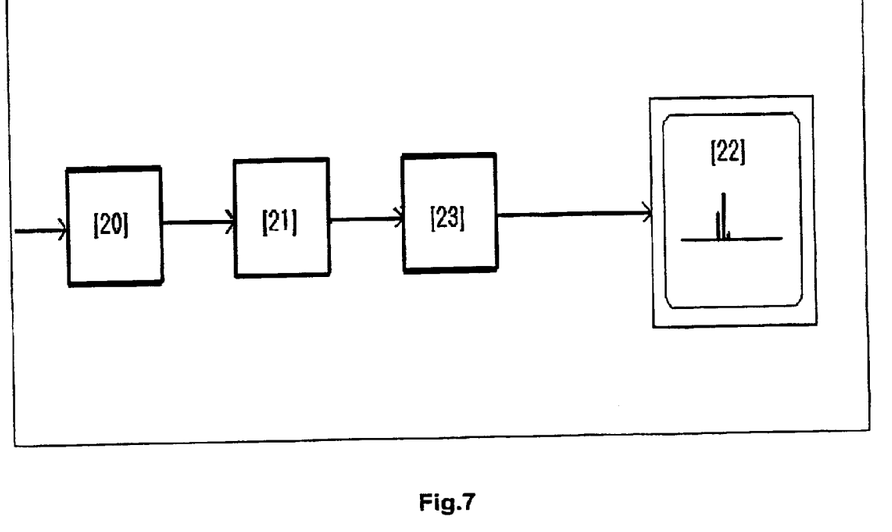
FIG. 7 shows the schematic block diagram of the opti-mum hybrid network layout of SOM, LVQ1, and LVQ2 to achieve the best results of seafloor classification.

The present invention more preferably provides a novel system for seafloor classification using artificial neural network (ANN) hybrid layout with the use of unprocessed multi-beam backscatter data, which comprises of an artificial neural network system that consists of a self-organizing map (SOM) preprocessor [20], learning vector quantization variants LVQ1 [21] and LVQ2 [23], and the memory/display module [22], wherein the input to the said SOM network [20] is derived from the output of an r.m.s. estimator module [19], which received its input from an A/D converter [16], which in turn acquired its input from a beam-former [13] attached to two identical perpendicularly oriented arrays [7] and [8] of a multi-beam acoustic device of FIG. 3, the said signal after having been rendered into analog format and filtered with the use of appropriate electronic hardware circuitry [14] and [15] respectively; the said SOM network [20] receiving the unprocessed multi-beam backscatter r.m.s data derived from the different pre-formed beams, and classifying the seafloor data into various roughness types that are distinguished based on the ship's cross-track angular multi-beam signal backscatter shape parameter, wherein a unique cluster is formed to represent a specific pattern of the input data; the number of clusters thus formed being equal to the number of differing patterns of the received seafloor data set; the said clusters having been formed without any prior knowledge of the number of different types of input patterns; the said clusters of data set being subsequently input to the LVQ1 [21]; the imperfection in classification arising from the process of unsupervised learning without any background knowledge being partially overcome by the LVQ1 network [21] as in FIG. 5; the said improvement in seafloor classification achievable by supervised learning based on the feedback provided to the said LVQ1 network [21] by the human interpreter based on the ground truth data set using an appropriate weight-updating criterion, with a correctly-representing weight-vector having been made to match the input more strongly, while a wrongly-representing weight-vector having been moved away from the input, so as to avoid misclassification at the central portion of the weight-distribution of each cluster; the outputs of the said LVQ1 [21] being subsequently input to the memory and display module [22], wherein the results thereby displayed having the utility for human interpretation to be made to enhance the quality of classification; the system of the present invention having the capability to incorporate an alternate hybrid layout wherein the LVQ1 [21] module could be replaced by another supervisable module LVQ2 [23] as in FIG. 6 that performs the alternate function of distinguishing the overlapping tails of the weight distribution of adjacent clusters to implement seafloor classification with minimal error; said system having additional capability to incorporate an improved hybrid layout, the said layout having the advantage of implementing seafloor classification based on the differing abilities of LVQ1 [21] and LVQ2 [23] as in FIG. 7, thereby providing the best possible classification, taking into account the central as well as tail portions of the weight distributions in the process of classification.

In an embodiment of the present invention, the neural network layout is a model-independent system that would provides the capability to the use of unprocessed backscatter data from the seafloor for the purpose of classification.

In another embodiment of the present invention, online seafloor classification is possible subsequent to the training phase of the network, thereby providing a cost-effective system having the capability to circumvent the need for pre-processing of the raw data.

In yet another embodiment of the present invention, a one-dimensional (i.e., bar-plot) presentation of a multitude of self-organized clusters of unprocessed (i.e., raw) input dataset and subsequent classification are provided to the human interpreter for further judgment of the quality of classification, and additional capability of visualization of the received input vectors in real time.

In still another embodiment of the present invention, said capabilities are extendable to the processed backscatter data as well.

In a further embodiment of the present invention, said system is capable of real-time redirecting cross-track multi-beam angular backscatter data received from the echo-sounder installed onboard the ship/AUV, to a remote data-bank.

In one more embodiment of the present invention, said redirection is carried out by representation of an extensive dataset by a few clustering units as formed in the said system layout on a ping-by-ping basis.

Novelty and Inventive Step

The novelty and inventive step of the present invention provides for an ingenious system for seafloor classification using artificial neural network (ANN) hybrid layout with the use of unprocessed multi-beam backscatter data, thereby circumventing the need for the conventional laborious and time-consuming preprocessing task that would have been required otherwise. The system of the present invention allows on-line (i.e., real-time) seafloor classification using backscatter data after training the self-organized mapping (SOM) network and learning vector quantization (LVQ) network. Further, the system of the present invention has the unique capability for the combined application of unsupervised SOM followed by supervised LVQ to achieve a highly improved performance in the said classification, which is hitherto non-existent. The system of the present invention has the additional capability for the use of a combination of the two variations of the LVQ layout to work together to achieve the best results in seafloor classification.

The novel system for seafloor classification using artificial neural network (ANN) hybrid layout provides:

1. The capability of using unprocessed multi-beam back-scatter data, thereby circumventing the need for the conventional laborious and time-consuming prepro-cessing task that would have been required otherwise.
2. The ability for on-line (i.e., real-time) seafloor classi-fication after training the self-organized mapping (SOM) network and learning vector quantization (LVQ) network using a large time-series dataset in the absence of background information.
3. The unique capacity for the combined use of unsuper-vised SOM followed by supervised LVQ to achieve a highly improved performance in the said seafloor classification, which is hitherto non-existent.
4. The means for the use of a combination of the two variants of the LVQ layout, namely LVQ1 (that mini-mizes misclassification) and LVQ2 (that adjusts over-lapping weights of adjacent clusters), to operate together to achieve the best results in seafloor classi-fication.

BRIEF DESCRIPTION OF THE ACCOMPANYING DRAWINGS

In the drawings accompanying this specification.

The present invention will now be described in detail with reference to the accompanying drawings which are given for explaining the present invention in a more clear manner and therefore should not be construed to limit the scope of the present invention in any manner.

DETAILED DESCRIPTION OF THE PREFERRED EMBODIMENTS

Figure 1:
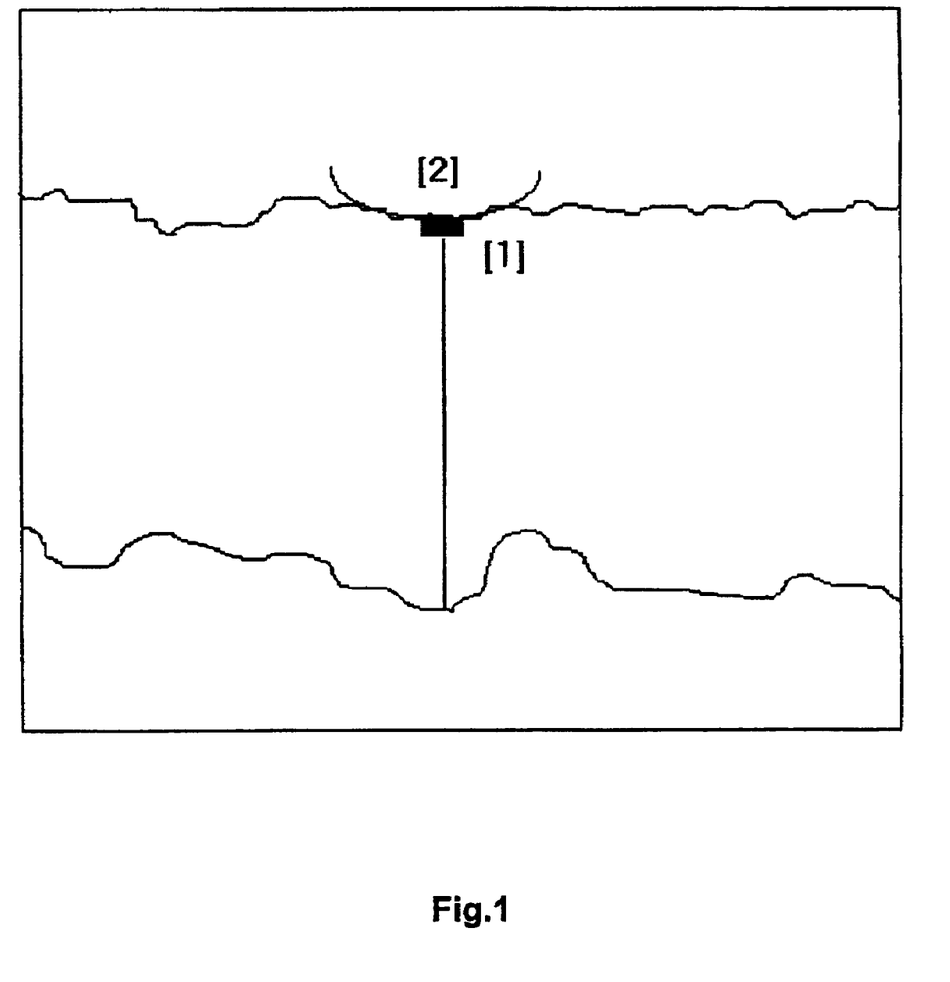
FIG. 1 represents the schematic of a single-beam echo-sounder conventionally used for seafloor mapping.

FIG. 1 represents the schematic of a single-beam echo-sounder, wherein an acoustic transducer [1] mounted beneath a survey ship [2] transmits acoustic pulses to the seafloor in a direction perpendicular to the sea surface and receives the echo that is backscattered from the seafloor. As the ship moves along a given preplanned track, a stream of successive echoes backscattered from the consecutive seg-ments on the seafloor are received by an onboard receiver hardware and are recorded in its data memory module as a time-series dataset. A drawback of this single-beam echo-sounder is that the seafloor area coverage achievable in this manner is limited to the footprint of a single acoustic beam that impinges on the seafloor.

Figure 2:
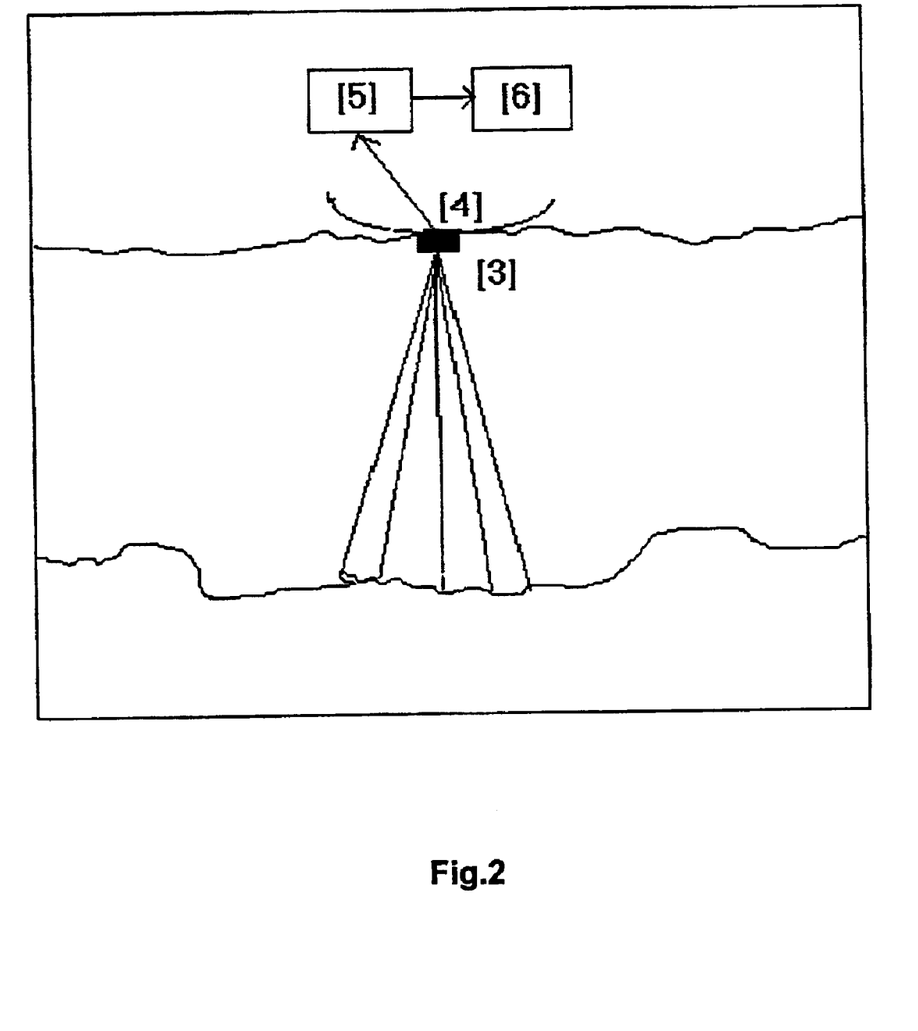
FIG. 2 shows the schematic of a multi-beam echo-sounder used for seafloor mapping over a larger area with the use of an array of acoustic beams.

FIG. 2 shows the schematic of a multi-beam echo-sounder [3] that is used for simultaneous seafloor mapping over large areas. In this geometry, the transducers are spaced in such a way that overlapping seafloor coverage is obtained. The fan-beam acoustic system consists of a linear array of transducers mounted beneath the ship's hull [4]. This fan-beam echo-sounder system consists essentially of two main sub-systems, namely, acoustic sub-system [5] and data pro-cessing sub-system [6]. The acoustic sub-system comprises of a linear array of transducers installed at a certain suitable angular separation, cable-connection boxes, an array of transmit-receive systems for the respective transducer array, and usually a roll-pitch-heave sensor for input to the online processing system. The data-processing control system employs a shipboard computer, data-storage devices, and so forth. The multi-beam echo-sounder is a device that provides higher resolution seabed mapping. This system is capable of achieving a greater coverage as well as generating a high-precision map. The use of multi-beam echo-sounding sys-tem results in the generation of seafloor profiles, which are correlated with respect to the single central track, and allows more reliable correlation of intersecting tracks.

FIG. 3 represents a schematic of the beam configuration of the multi-beam echo-sounder used as part of the novel system of the present invention for seafloor classification using artificial neural network (ANN) hybrid layout with the use of unprocessed multi-beam backscatter data, which consists primarily of two identical arrays [7] and [8] of acoustic transducers mounted at right angles to each other. Each array is a combination of several sub-arrays [7.1], ... [7.n] and [8.1], ... [8.n] respectively, each consisting of a multitude of elements. These elements form a set of channels [9.1], [9.2], ... [9.n], each channel consisting of a group of elements in series. Similarly, for other counterpart transducer array, the receiving channels are [10.1], [10.2] ... [10.n]. Because both the arrays are identical, they can be used for either transmission or reception. In the receiving mode, signals from the different channels are pre-amplified, corrected for attenuation, and thereafter beam-forming is performed using appropriate delays. Altogether, a fixed number of pre-formed beams (p.f.b) are formed within the 90° swath. The beams are equally spaced (~1.5°), average beam-widths varying from 1.5° to 2.3° for deep-water surveys. The half-power beam-width becomes approximately double when the system is operated in shallow water mode. The beam-formed outputs are tapped at the bottom-echo module to estimate the depth corresponding to the beams from different directions. In order to achieve uniform insonification over a swath of 90°, the system is designed to operate in a swath mode.

Figure 4:
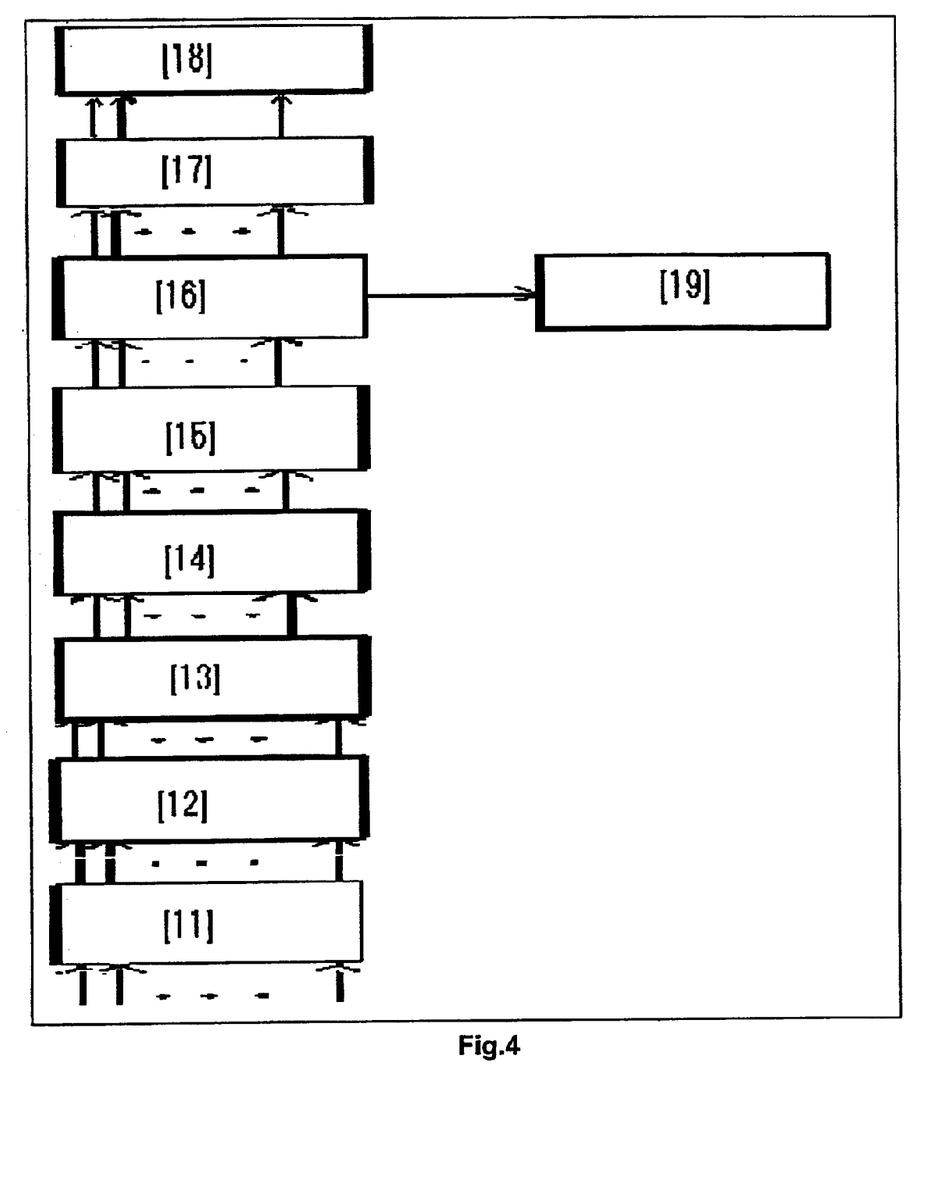
FIG. 4 presents a block schematic of the signal processing hardware used for beam-forming of the backscattered signal stream.

FIG. 4 illustrates the block schematic of the signal processing hardware used for beam-forming of the backscattered signal stream, which consists primarily of a pre-amplifier [11], time-varying gain adjustment circuitry [12], beam-former [13], digital-to-analog converter [14], filter [15], analog-to-digital (A/D) converter [16], bottom tracking gate [17], and display [18]. The digital data used for seafloor classification are derived from the output channel of the A/D converter [16]. This signal is input to an r.m.s. estimator module [19], whose outputs are used as the input vectors for further processing.

FIG. 5 represents the schematic block diagram of the hybrid ANN layout used in the system of the present invention. This layout consists of a self-organizing map (SOM) network [20], learning vector quantization variant 1 (LVQ1) [21], and the memory/display module [22]. The input to the said SOM network [20] is derived from the output of the r.m.s. estimator module [19]. In the system of the present invention, the said SOM network [20] receives the unprocessed multi-beam backscatter r.m.s. data (whose pattern is the envelope of the r.m.s. signal amplitude versus beam number in the cross-track direction) obtained from the different pre-formed beams, and classifies the seafloor data into various roughness types. The different roughness types are distinguished based on the ship's cross-track angular multi-beam signal backscatter shape parameter. Each cluster so formed represents a unique pattern of the input data. Accordingly, the number of clusters formed is equal to the number of differing patterns of the received seafloor data set. These clusters are formed with the inherent unsupervised learning feature of the SOM network without any prior knowledge of the number of different types of input patterns. The clusters of the data set so formed by the SOM [20] are input to the LVQ1 [21]. The imperfection in classification, which is inherent in the said SOM network [20] due to the nature of unsupervised learning without any background knowledge (of the input data types), is partially overcome by the LVQ1 network [21]. This improvement in seafloor classification results from the supervised learning based on the feedback provided to the said LVQ1 network [21] by the human interpreter, judging from the ground truth data set.

The said improvement is based on the "reward-punishment" criterion, wherein a correctly representing weight-vector is made to match the input more strongly, while a wrongly representing weight-vector is moved away from the input, so that it will avoid misclassification in future comparisons. The said LVQ1 [21] works more efficiently at the central portion of the weight distribution of each cluster formed in the SOM [20] than at the tail portion of the said distribution because of the inability of the said LVQ1 [21] to distinguish the overlapping tails of adjacent clusters. The outputs of the said LVQ1 [21] are subsequently input to the memory and display module [22], wherein the human interpreter can make use of the results that are thereby displayed to make further judgments on the quality of classification.

FIG. 6 shows the schematic block diagram of an alternate hybrid ANN layout used in the system of the present invention together with the layout shown in FIG. 5. This layout is similar to the one given in FIG. 5, the only difference being that while the LVQ1 [21] avoids misclassification to a greater extent at the central portion of the weight distribution of each cluster formed in SOM [20] than at the tail portion of the said distribution, the LVQ2 network focuses on minimizing misclassification (arising in SOM) as a result of its ability to distinguish the overlapping tails of the weight distribution of adjacent clusters. The said LVQ2 [23] employs a technique for redistribution of the weights of the overlapping portions of the adjacent clusters to the respective parent clusters. The outputs of the said LVQ2 [23] are subsequently input to the memory and display module [22], wherein the results are displayed and stored to enable the human interpreter to make further judgments on the quality of classification.

FIG. 7 illustrates the schematic block diagram of an improved hybrid ANN layout used in the system of the present invention together with the layout shown in FIGS. 5 & 6. This layout has the advantage of implementing seafloor classification based on the differing abilities of LVQ1 [21] and LVQ2 [23], thereby providing the best possible classification, taking into account the central as well as the tail portions of the weight distributions in the process of classification.

Figure 8:
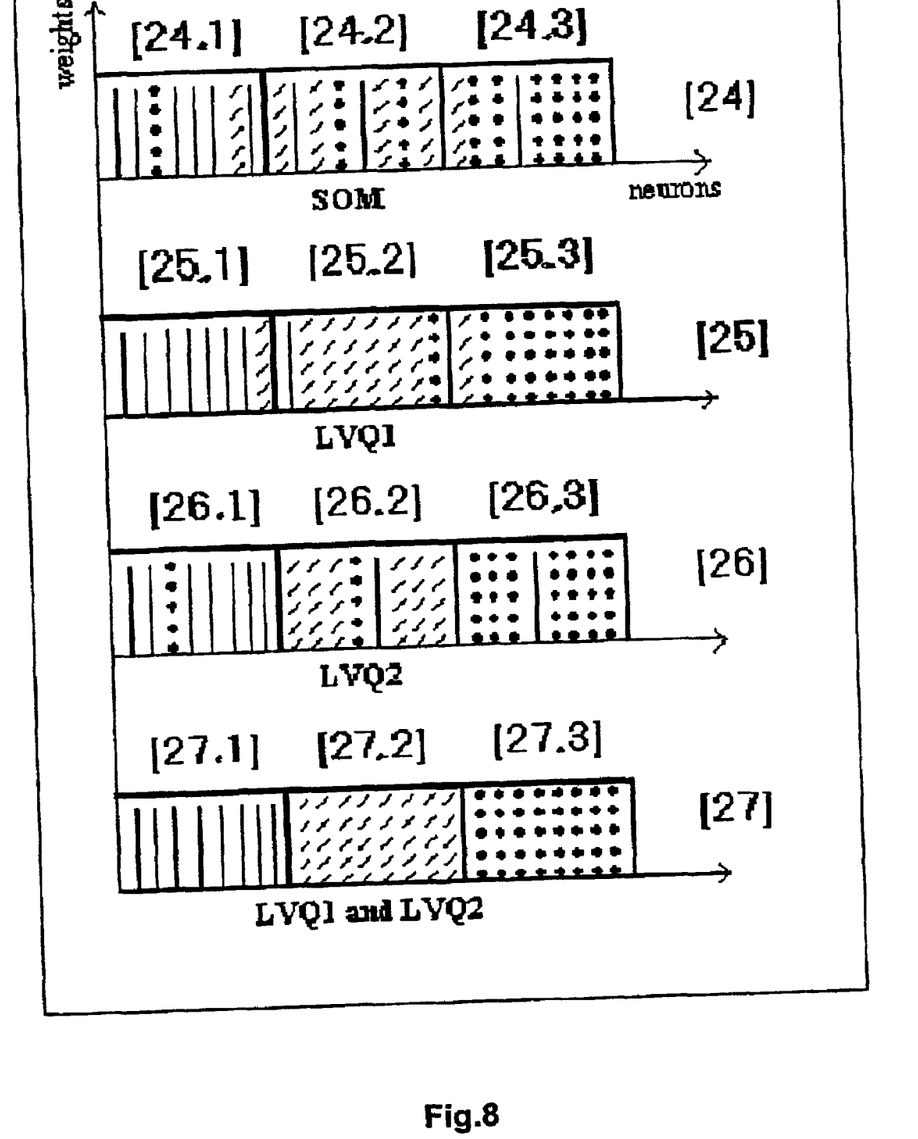
FIG. 8 illustrates the clustering of the unprocessed data vectors presented to the SOM network to achieve improved classification results using the supervised learning features of LVQ1 and LVQ2 both independently and combined.

FIG. 8 illustrates the clustering of the unprocessed data vectors presented to the aforesaid SOM network [20] and the supervised learning features of LVQ1 [21] and LVQ2 [23], both independently and combined. In this illustration, two weight-vectors located on either side of the boundary (shown as thick vertical line) have been designated as lying within the overlapping region of adjacent clusters. In the illustration of FIG. 8, the segments [24.1], [24.2], and [24.3] represent three consecutive weight-distribution-patterns [24] formed by the unsupervised SOM [20], wherein the symbols (•), (|), and (/) indicate three different classes of seafloor roughness parameters. As a representative example, the weight-distribution-pattern [25] at the output of the supervised architecture LVQ1 [21] clearly indicates the removal of the central misclassified portions (•) of [24.1] and [24.2], and their redeployment into the parent cluster represented by the segment [24.3], thereby providing a better redistribution in segments [25.1], [25.2], and [25.3] of the fill weight-distribution-pattern [25]. The weight-distribution-pattern [26] illustrates the effectiveness of the supervised layout LVQ2 [23] wherein the segments [26.1], [26.2], and [26.3] indicate the removal of the misclassified data vector (/) from the tail portions of [24.1] and [24.3] of the SOM-output [24] and their redeployment into its parent segment [24.2] as shown in [26], while ignoring the classification error in the central portions of the weightdistribution-pattern in [26.1] indicated by (•). The weight-distribution-pattern [27] illustrates the effectiveness of classification with the combined use of LVQ1 [21] and LVQ2 [23] wherein the misclassifications found in both the central and tail portions of [24] are corrected to provide a fully corrected weight-distribution-pattern [27].

Figure 9:
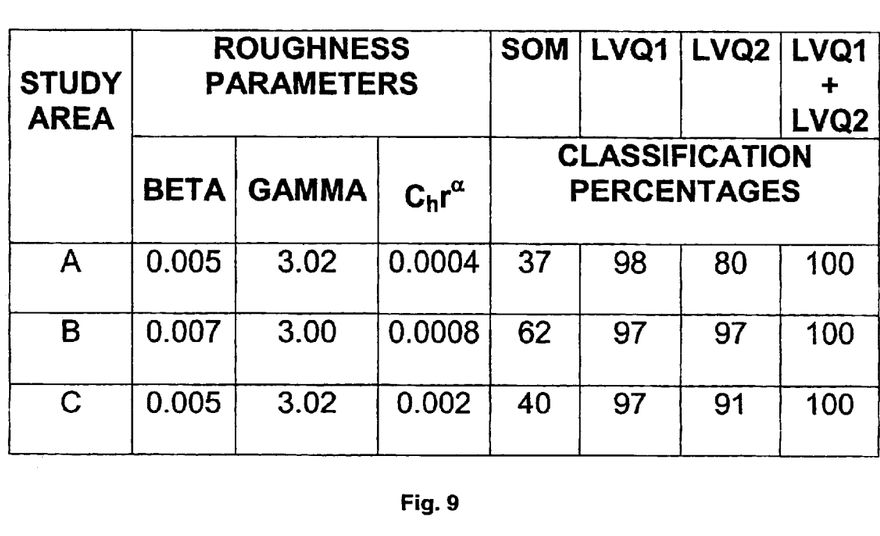
FIG. 9 shows the Table of seafloor classification results based on SOM, LVQ1, and LVQ2 layouts.

FIG. 9 shows a Table of roughness parameters and classification results (in percentage) for three seafloor areas examined using LVQ1, LVQ2 and a combination of both the above supervised layouts, using SOM as the preprocessor in each case.

Generally, in the Hydrosweep multibeam echosounding system, the two outer beam values on the port side and the starboard side are erroneous and are neglected. Consequently, the original 59 beam input vector becomes an array of 55 beam values from angle −45° to +45°. In this embodiment, each of the 55 beam values for 5 input vectors at a time is averaged for input vector smoothening. By reducing variations in input patterns from the same seafloor region, we obtain marginally improved classification performance albeit at the cost of computational time.

The preprocessor block uses unsupervised learning to form a self-organised mapping of 100 input vectors from various seafloors. The input data vectors are converted from the decibel scale to their natural values. Each vector is then normalised to match the range of the weights. The data is still unprocessed in the sense that no preprocessing algorithm (PROBASI) has been applied to it. From each seafloor area, a representative backscatter data set is chosen for training the SOM network. In this architecture, neighbouring entities called neurons compete with each other by the mutual lateral interaction of their weights. The weights in the neighbourhood of the closest matching neuron to the input vector presented are updated from an initial random distribution, so as to bring them closer to this input vector. This leads to the formation of local neighbourhoods, depicting a particular class. The learning rate is an exponentially decaying function $0.5/(t^{0.2})$ where t is the number of iterations, thus causing the rate of weight updating to be initially high and subsequently decreases gradually for finer tuning in successive iterations, until ultimately only one neuron excites in response to an input presented. At the end of execution of the SOM algorithm, the input space arranges into coarse clusters, each representing a unique input pattern, without any a priori information. Future input vectors presented in the testing phase are assigned to a cluster in the output space that best matches the input vector. The power law parameters (gamma and beta) for the different seafloor regions, obtained by physical modelling, are used to correlate the obtained results.

The trained weight matrix after employing the SOM network are used as the inputs for a supervised learning network, namely LVQ. Here, training and testing is carried out simultaneously for a few iterations until the network weights belonging to each cluster are truly representative of that cluster. The learning rate is still exponential but with a much smaller initial value to allow fine tuning of neuron weights. In LVQ1, with user control for 3–4 input vectors from each class, the erroneously classifying weight vector is moved away from the input. If classification is correct, the weight vector is strengthened towards the input and eventually misclassification is avoided in further testing. LVQ2 goes a step further in overcoming the overlapping weight biases in regions of crossover of adjacent clusters by applying the window function at their boundary for correction to 1–2 neurons. The window is divided into half and corrections are made only when the excited neuron falls on the wrong side of the mid-plane by moving that vector away from the input and simultaneously bringing the neuron on the correct half of the window closer to it. A plot is made of probability density function (pdf) of excited neuron versus the frequency of excitation.

In particular, we used three seafloor regions A, B and C for our comparative study. The classification results are tabulated in FIG. 9 for SOM, LVQ1 and LVQ2 for unprocessed backscatter data.

On comparing the tabulated power law parameters (gamma and beta), acting as an indicator of seafloor interface roughness, with self-organized clusters after training by SOM, we have notice that areas A and C are of the same seafloor type. Between the two, classification results have indicated enhanced performance with LVQ for area C, which is rougher as indicated by its higher $C_h r^\alpha$ value (rms roughness between two points separated by a distance of 100 m). The most significant contribution of this invention is the ability of the network to give superior response to unprocessed data, thereby eliminating the need for tedious preprocessing of the multi-beam backscatter data for seafloor roughness theory, thereby providing online indication of roughness even using raw data.

ADVANTAGES OF THE PRESENT INVENTION

The main advantages of the present invention are:

1. It provides the capability for combined use of the two variants of the learning vector quantization (LVQ) network to achieve the best classification of the seafloor characteristics, which is a capability that is hitherto non-existent.
2. It provides a self-organization of multi-beam input data vectors into coarse clusters in the output space without any a priori information.
3. It provides the capability to the use of raw dataset as input vectors to the classification network.
4. It reduces computational time overhead, which is a capability that is not available with hitherto known physical models.
5. It provides a means for online seafloor classification using raw backscatter data subsequent to suitable training of the network.
6. It provides for high network performance by its ability for the successive application of a duality of means for avoidance of misclassification and the capability for recovery of overlapped information.
7. It allows for the capability for easy and real-time transmission of remote data received by the echosounder onboard the ship/autonomous underwater vehicle (AUV), to the remote databank; the said transmission having been carried out by the representation of an entire dataset of cross-track multi-beam angular backscatter information by a few clustering units formed in the said system on a ping-by-ping basis.

What is claimed is:

1. A system for classifying seafloor roughness using artificial neural network hybrid layout from unprocessed multi-beam backscatter data, said system comprising a means for generating unprocessed multi-beam backscatter r.m.s. data attached to the input of a self-organizing map preprocessor (20), said SOM preprocessor being attached through one or more Learning Vector Quantization variants (21 and 23) to a memory/display module (22).

2. A system as claimed in claim 1, wherein the means for generating unprocessed multi-beam backscatter r.m.s. data comprises a multi-beam acoustic device mounted beneath a ship's hull and attached to an r.m.s. estimator module through a beam former module.

3. A system as claimed in claim 2, wherein the multi-beam acoustic device comprises a linear array of transducers connected to a roll-pitch-heave sensor through cable connection boxes and an array of transmit-receive systems.

4. A system as claimed in claim 3, wherein the multi-beam acoustic device comprises of two identical arrays of acoustic transducers mounted at right angles to each other.

5. A system as claimed in claim 4, wherein each array of the acoustic transducer is a combination of several sub-arrays and each sub array consists of a multitude of elements.

6. A system as claimed in claim 5, wherein each element forms a set of channels.

7. A system as claimed in claim 4, wherein the arrays can be used either for transmission or for reception of signals.

8. A system as claimed in claim 2, wherein the multi-beam acoustic device is connected to the beam former module through a preamplifier and a time varying gain adjustment circuit.

9. A system as claimed in claim 2, wherein beani forming is accomplished using appropriate delays.

10. A system as claimed in claim 2, wherein the beam former module is connected to the r.m.s. estimator module through a digital to analog converter, a filter, and a analog to digital converter.

11. A system as claimed in claim 10, wherein a display means is optionally connected to the analog to digital converter.

12. A system as claimed in claim 11, wherein the display means is connected to the analog to digital converter through a bottom-tracking gate.

13. A system as claimed in claim 2 wherein the output pattern of the r.m.s. estimator module is the envelope of the r.m.s. signal amplitude vs. beam number in cross-track direction.

14. A system as claimed in claim 1, wherein self-organizing map preprocessor classifies the seafloor data into various roughness types and clusters them.

15. A system as claimed in claim 14, wherein he roughness parameters are distinguished based on the ship's cross-track angular multi-beam signal backscatter shape parameter.

16. A system as claimed in claim 14, wherein each cluster formed represents an unique pattern of the input data.

17. A system as claimed in claim 14, wherein the number of clusters thus formed is equal to the number of differing patterns of received seafloor data set.

18. A system as claimed in claim 14, wherein the clusters are formed with the inherent unsupervised learning feature of the self-oraanizina man preprocessor.

19. A system as claimed in claim 14, wherein the clusters are formed without any prior knowledge of the number of the different types of input patterns.

20. A system as claimed in claim 1, wherein the Learning Vector Quantization variant overcomes the imperfection in classification arising from the process of unsupervised classification done by the self-organizing map preprocessor to provide an improvement in seafloor classification.

21. A system as claimed in claim 20, wherein the improvements in the seafloor classification is achieved by supervised learning.

22. A system as claimed in claim 21, wherein the supervised learning is imparted to the Learning Vector Quantization by a human interpreter based on a ground truth data set.

23. A system as claimed in claim 1, wherein said system incorporates a Learning Vector Quantization designed to avoid misclassification at the central portion of the weight-distribution of each cluster or a Learning Vector Quantization designed to distinguish the overlapping tails of the weight distribution of adjacent clusters or a combination of both.

24. A system as claimed in claim 23, wherein the Learning Vector Quantization designed to avoid misclassification at the central portion is based on "reward-punishment" criterion.

25. A system as claimed in claim 24, wherein the Learning Vector Quantization moves the weight-vector from the input if it is wrongly represented and the weight-vector is made to match the input more closely if its correctly represented.

26. A system as claimed in claim 23, wherein the Learning Vector Quantization designed to distinguish the overlapping of tails employs the technique of redistribution of the weights of the overlapping portion of the adjacent clusters to the respective parent clusters.

27. A system as claimed in claim 1, wherein a human interpreter can make use of the results displayed on the display device to make further judgements on the quality of classification.

28. A system as claimed in claim 1, wherein the neural network layout is a model-independent system that would provide the capability to the use of unprocessed backscatter data from the seafloor for the purpose of classification.

29. A system as claimed in claim 1, wherein online seafloor classification is possible subsequent to the training phase of the network, thereby providing a cost-effective system having the capability to circumvent the need for pre-processing of the raw data.

30. A system as claimed in claim 1, wherein a one-dimensional (i.e., bar-plot) presentation of a multitude of self-organized clusters of unprocessed (i.e., raw) input dataset and subsequent classification are provided to the human interpreter for further judgment of the quality of classification, and additional capability of visualization of the received input vectors in real time.

31. A system as claimed in claim 1, wherein said system is also capable of processing backscatter data.

32. A system as claimed in claim 31, wherein said communication is carried out by representation of an extensive dataset by a few clustering units as formed in the system layout on a ping-by-ping basis.

33. A system as claimed in claim 1, wherein said system is capable of real-time communication of cross-track multi-beam angular backscatter data received from the echo-sounder installed onboard a ship/AUV to a remote databank.

34. A system for seafloor classification using artificial neural network hybrid layout with the use of unprocessed multi-beam backscatter data, comprising an artificial neural network system that consists of a self-organizing map preprocessor [20], learning vector quantization variants LVQ2 [21] and LVQ2 [23], and a memory/display module [22], wherein the input to the said self-organizing map preprocessor [20] is derived from the output of an r.m.s. estimator module [19], which receives its input from an A/D converter [16], which in turn acquires its input from a beam-former [13] attached to two identical perpendicularly oriented arrays [7] and [8] of a multi-beam acoustic device that provide a signal that is rendered into analog format and filtered with the use of appropriate electronic hardware circuitry [14] and [15] respectively; the said self-organizing map preprocessor [20] receiving unprocessed multi-beam backscatter r.m.s data derived from different pre-formed beams as seafloor data, and classifying the seafloor data into various roughness types that are distinguished based on a ship's cross-track angular multi-beam signal backscatter shape parameter, wherein a unique cluster is formed to represent a specific pattern of the input data; the number of clusters thus formed being equal to the number of differing patterns of the received seafloor data set; the clusters having been formed without any prior knowledge of the number of different types of input patterns; the said clusters of data set being subsequently input to the LVQ1 [21]; the imperfection in classification arising from the process of unsupervised learning without any background knowledge being partially overcome by the LVQ1 network [21]; the said improvement in seafloor classification achievable by supervised learning based on the feedback provided to the said LVQ1 network [21] by the human interpreter based on a the ground truth data set using an appropriate weight-updating criterion, with a correctly-representing weight-vector having been made to match the input more strongly, while a wrongly-representing weight-vector having been moved away from the input, so as to avoid misclassification at the central portion of the weight-distribution of each cluster; the outputs of the LVQ1 [21] being subsequently input to the memory and display module [22], wherein the results thereby displayed can be interpreted by a human to enhance the quality of classification; the system of the present invention being capable of incorporating an alternate hybrid layout wherein the LYQ1 [21] module can be replaced by another supervisable module LVQ2 [23] that performs the alternate function of distinguishing the overlapping tails of the weight distribution of adjacent clusters to implement seafloor classification with minimal error; said system having additional capability to incorporate an improved hybrid layout, the layout having the advantage of implementing seafloor classification based on the differing abilities of LVQ1 [21] and LVQ2 [23], thereby providing the best possible classification, taking into account the central as well as tail portions of the weight distributions in the process of classification.

* * * * *

UNITED STATES PATENT AND TRADEMARK OFFICE
CERTIFICATE OF CORRECTION

PATENT NO. : 6,763,303 B2
DATED : July 13, 2004
INVENTOR(S) : Bishwajit, Chakraborty et al.

It is certified that error appears in the above-identified patent and that said Letters Patent is hereby corrected as shown below:

Column 11,
Line 9, delete the word "of" (first occurrence).
Line 23, change the word "beani" to -- beam --.
Line 42, change "he" to -- the --.
Line 53, change the word "self-oraanizina man" to -- self-organizing map --.

Column 12,
Line 27, change the word "to" to -- for --.
Line 55, change the word "LVQ2" to -- LVQ1 --.
Lines 57 and 65, delete the word "said".

Column 13,
Lines 9, 13 and 15, delete the word "said".
Line 16, delete the word "the".

Column 14,
Line 7, change the word "LYQ1" to -- LVQ1 --.

Signed and Sealed this

Sixteenth Day of November, 2004

JON W. DUDAS
*Director of the United States Patent and Trademark Office*